United States Patent [19]

Uemura et al.

[11] 4,281,605
[45] Aug. 4, 1981

[54] APPARATUS FOR REGENERATING FLUIDIZING MEDIUM

[75] Inventors: Toshio Uemura; Hiroshi Kagabu; Kenji Arisaki; Noboru Kajimoto; Shinshi Akatsuka; Takuaki Fujimoto, all of Hiroshima, Japan

[73] Assignee: Babcock-Hitachi Kabushiki Kaisha, Tokyo, Japan

[21] Appl. No.: 72,243

[22] Filed: Sep. 4, 1979

[30] Foreign Application Priority Data

Sep. 11, 1978 [JP] Japan .................................. 53-110710

[51] Int. Cl.³ .............................................. F23J 1/00
[52] U.S. Cl. ................................ 110/245; 110/165 R; 110/171; 210/525; 210/661; 134/109
[58] Field of Search ............ 110/245, 238, 255, 165 R, 110/347, 171; 210/189, 71, 525, 535, 20; 134/109

[56] References Cited

U.S. PATENT DOCUMENTS

| | | | |
|---|---|---|---|
| 2,155,854 | 4/1939 | Barnes et al. | 134/109 |
| 2,413,375 | 12/1946 | Pomeroy | 210/535 |
| 3,121,680 | 2/1964 | Ciabattari | 210/525 |
| 3,465,886 | 9/1969 | Pilanczyk | 210/525 |
| 3,537,987 | 11/1970 | Copeland | 210/20 |
| 4,060,041 | 11/1977 | Sowards | 110/245 |
| 4,181,614 | 1/1980 | Steenhorst | 210/525 |
| 4,192,747 | 3/1980 | Wykoff | 210/525 |
| 4,196,676 | 4/1980 | Brown et al. | 110/245 |

Primary Examiner—Henry C. Yuen
Attorney, Agent, or Firm—Koda and Androlia

[57] ABSTRACT

This invention relates to an apparatus of regenerating fluidizing medium employed in a fluidized-bed incinerator, wherein the sticking matter attached to the fluidizing medium employed in the incinerator in the process of burning up in the incinerator the ash collected from power plant boiler exhaust gases (EP ash) is removed from the fluidizing medium chemically and physically.

7 Claims, 1 Drawing Figure

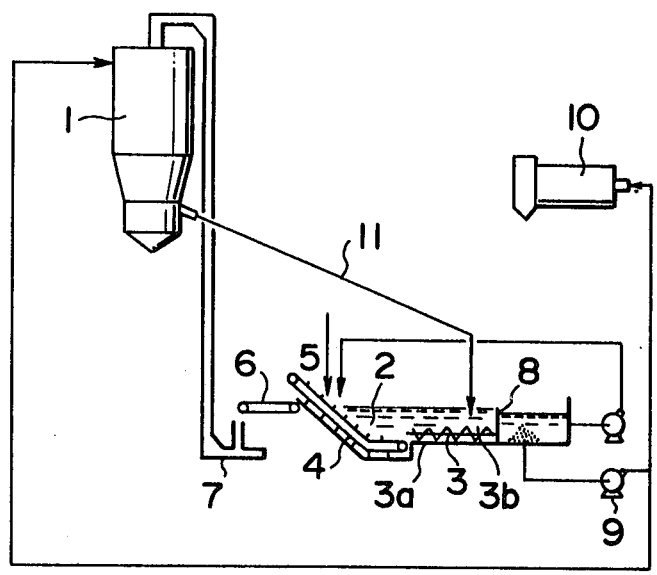

APPARATUS FOR REGENERATING FLUIDIZING MEDIUM

BACKGROUND OF THE INVENTION

(1) Field of the Invention

This invention relates to an apparatus for regenerating fluidizing medium. More particularly the invention relates to an apparatus of regenerating the fluidizing medium employed in a fluidized-bed incinerator, wherein the sticking matter attached to the fluidizing medium employed in the incinerator in the process of burning up in the incinerator the ash collected from power plant boiler exhaust gases (hereinbelow referred to as "EP ash") is removed from the fluidizing medium chemically and physically.

(2) Description of the Prior Art

From boilers burning large amount of crude heavy oil, such as those of large thermoelectric power plants, is discharged EP ash, i.e., heavy oil ash containing unburned carbon. When this EP ash is disposed of as refuse, it usually is not suitable for filling-up due to the peculiarity of its properties. Therefore, it has to be disposed of by specified persons, in many cases. There arise many problems such as increase in the cost of transportation and difficulty of handling due to its pulverized state. In view of this, as incidental equipment for large-size boilers that cause these problems have been developed apparatuses that solve or alleviate these problems by burning up the EP ash and achieving reduction in volume and weight. These apparatuses are advantageous in that vanadium compound contained in the EP ash is concentrated and thus concentrated vanadium compound can be appraised equally to vanadium ore. Therefore, there is an added value that its recovery is enhanced.

These apparatuses include various types of incinerator furnaces: for example, cyclone type, rotary kiln type, stoker type and fluidized-bed type. However, it is well known that each of them has both merits and demerits and that it is not easy for them to burn up the EP ash. Out of them, the apparatus that uses a fluidized-bed furnace to treat the EP ash is regarded as important because it has relatively good adaptability to variations in load and ash content. However, even this fluidized-bed incinerator has the following drawbacks. That is, the fluidizing medium (an active or inactive substance comprising sand or CaO as its main component) thickens with time due to the adhesion of sticking matter and fails to flow smoothly; so that long-term continuous operation of the incinerator becomes difficult. This makes it necessary to stop the incinerator to renew the fluidizing medium.

Therefore, there are disadvantages in terms of operation efficiency, operating cost, cost of medium and the like, and it is desired to eliminate these disadvantages.

SUMMARY OF THE INVENTION

It is an object of this invention to eliminate the above-described drawbacks of the prior art, i.e., to provide an apparatus of regenerating fluidizing medium without stopping the fluidized-bed incinerator and recycling thus regenerated medium into the incinerator.

It is another object of the invention to provide an apparatus for regenerating fluidizing medium which is suitable for the recovery of vanadium and other valuables in the succeeding step of treatment.

These objects and others have been accomplished by the apparatus which permits the abovementioned chemical and physical removal of sticking matter from fluidizing medium.

BRIEF DESCRIPTION OF THE DRAWINGS

The FIGURE is an embodiment of the apparatus according to the invention.

DETAILED DESCRIPTION OF THE PREFERRED EMBODIMENTS

Table 1 shows an example of the results of analysis of the sticking matter attached to the fluidizing medium in the process of burning up the EP ash in a fluidized-bed incinerator.

TABLE 1

| Sample | Composition (%) | | | | | | | |
|---|---|---|---|---|---|---|---|---|
| | $Na_2O$ | $SO_3$ | $V_2O_5$ | $SiO_2$ | $Al_2O_3$ | $Fe_2O_3$ | NiO | CaO |
| Sticking ash | 16.6 | 33.3 | 14.0 | 3.6 | 5.0 | 11.1 | 11.7 | 1.6 |

As a method to remove from fluidizing medium the sticking matter having the composition shown in the above table and thereby to regenerate fluidizing medium, mechanical crushing was considered to be effective. Thus several experiments have been made with this method, as the result of which, however, it has been found that it is not desirable to separate the sticking matter from fluidizing medium by mechanical crushing. This is because the sticking matter is higher than sand and other fluidizing media in elasticity and shock resistance. Therefore, when a force strong enough to crush and separate the sticking matter is applied, the medium serving as nucleus will also be crushed, making it impossible to accomplish the very object of regeneration.

The reason for the very high elasticity of the sticking matter is considered to be in that a hard spongy structure is formed by $V_2O_5$, $Al_2O_3$, $Fe_2O_3$, Nio and so forth shown in Table 1 above and the framework of this spongy structure is filled with $Na_2SO_4$ (formed by $Na_2O$ and $SO_3$ shown in Table 1 above).

Further, when in order to meet the recent requirements of pollution-control regulations the boiler exhaust gas is treated with $NH_3$ to eliminate $SO_x$ contained in the exhaust gas, the EP ash is made to contain an appreciable amount of $(NH_4)_2SO_4$ which changes into acid ammonium sulfate depending on the temperature condition. This ammonium sulfate causes particles of fluidizing medium to adhere to each other, thus converting them into a mass having high shock resistance. Therefore, in this case, too, it has been found that the fluidizing medium cannot be regenerated by the above-described mechanical crushing method.

Giving consideration to the composition of sticking matter shown in Table 1 above and to the fact that $Na_2SO_4$ occupying about 50% thereof is soluble in water, the inventors of this invention have conducted several experiments in expectation of the possibility of the adhesion and elasticity of sticking matter being reduced by extracting $Na_2SO_4$ with water under stirring the fluidizing medium to which the sticking matter is attached.

As the result, the inventors of the present invention have confirmed that the fluidizing medium can be regenerated by means of the apparatus of the present invention wherein a stirring device for giving mechanical blows to the medium to be generated and a device for feeding out the regenerated medium are provided in the first liquid tank; a device for receiving a mixture of the liquid having the sticking matter dissolved therein and the insoluble fine particles and for separating therefrom the insoluble fine particles as slurry is provided in the second liquid tank adjoining said first liquid tank; and a device for supplying the regenerated medium fed out from said first liquid tank to a fluidized-bed furnace is provided.

FIGURE shows an example of a suitable apparatus of regenerating fluidizing medium according to this invention.

From a fluidized-bed furnace 1 in which an active or inactive substance containing sand of 0.8 mm$\phi$ in particle size or CaO or the like as the main component or a mixture thereof is employed as the fluidizing medium, the fluidizing medium is discharged through line 11 constantly at the rate of 250 kg/hr so that the average residence time of the medium in the bed is about 20 to 30 hours, in order that accumulation by adhesion of the ash content of the EP ash on the medium be kept below a certain standard level. The medium thus discharged is put in a water tank 2 provided in the vicinity of the furnace bottom. As the medium drops into the water tank at about 650° C., temperature in the water tank is kept at about 100° C., and vapor being constantly produced is partly removed by returning it to the incinerator or by taking other measures. The medium and sticking matter in the water tank are first subjected to thermal shock, and the medium has its surface roughened due to dissolution of the soluble content of sticking ash, resulting in weakened adhesion of sticking matter. In that state, the medium enters a pug mixer 3 provided at the tank bottom. To prevent the medium from floating due to mixing and stirring in water and to the mechanical striking force applied thereto, due consideration is given to the rotational speed of the pug mixer, its blade angle and the like. The pug mixer is a device that consists of a plurality of rod-like members 3a and a screw 3b. When the medium is mixed and stirred in the pug mixer for about 10 minutes, the rugged sticking matter is almost all peeled off. Part of the sticking matter thus peeled off floats in water in a suspended state, while another part of it is fed together with the medium to a drag chain conveyor 4 serving to send the regenerated medium. The chain of drag chain conveyor 4 moves at a constant speed over the bottom casing of water tank to pick up part of the medium and insoluble content. In order to keep the solution unsaturated and separate the insoluble content, there is provided a water feed line 5 that permits to perform water washing over the water surface. The most part of the insoluble content is thus separated out, and water is removed through the sloped portion of drag chain conveyor which is located above the water surface. Thereafter, thus treated medium is sent to case conveyor 7 through a flat belt conveyor 6. The medium cleared of the ash content is returned to the furnace by a case conveyor 7 at the rate of 235 kg/hr.

On the other hand, the water tank is provided with an overflow wall 8 to divide the tank into two. The supernatant is recirculated as treating liquid and/or fed to the upper part of drag chain conveyor 4. Precipitated slurry of high concentration is constantly drawn out, pressurized by volute type slurry pump 9 and then sprayed into an incinerator 10 using a two-fluid spray burner of the outside-mixing type to reduce clogging with particles. The slurry can be fed to the free board of fluidized-bed furnace 1. The adoption of the complete closed system makes it possible to prevent secondary pollution incidental to the installation of this apparatus for regenerating fluidizing medium.

Pilot burners are used in the incinerator 10. After moisture is evaporated and slurry burned up, oxides and sulfides of Fe, V and Ni remain, and the vanadium component can be effectively utilized. With consideration to wear resistance and corrosion resistance, all the equipment is made of stainless steel.

In place of the pug mixer 3 and drag chain conveyor 4 shown in FIGURE, an inclined type bi-axial paddle mixer can also employed as a device to stir the medium by giving mechanical blows and, at the same time, to feed out the regenerated medium. Its action and effect are almost the same as in the foregoing case. In this case, however, as there is formed a zone on the water surface in which the medium is mixed and stirred with a low moisture content, not only the peel-off rate of the insoluble content is increased but also the medium itself is crushed to some extent. Therefore, though the apparatus can be simplified, the particle size has to be controlled by removing fine particles from the regenerated medium.

The apparatus of the present invention has many advantages. That is, the fluidizing medium can be regenerated continuously and the fluidized-bed incinerator can be operated continuously. The slurry separated is burned up in an after-burning furnace, etc., in which valuable contents such as vanadium compounds can be recovered. The numbers of operators and consumption of the fluidizing medium can also be reduced.

What is claimed is:

1. An apparatus for regenerating fluidizing medium by removing sticking matter attached thereto comprising a stirring device for giving mechanical blows to a medium to be regenerated and a device for feeding out the regenerated medium provided in a first liquid tank; a means for supplying a mixture of a liquid having the sticking matter dissolved therein and insoluble fine particles from the first liquid tank and for separating therefrom the insoluble fine particles as slurry provided in a second liquid tank adjoining said first liquid tank; and a device for supplying the regenerated medium fed out from said first liquid tank to a fluidized-bed furnace.

2. An apparatus according to claim 1 wherein the stirring device for giving mechanical blows to the medium to be generated is a pug mixer.

3. An apparatus according to claim 1 wherein there are provided a line for supplying supernatant having the sticking matter dissolved therein from said second liquid tank to said first liquid tank and another line for feeding water to said first liquid tank.

4. An apparatus according to claim 1 wherein there is provided in said first liquid tank a device for giving mechanical blows to the medium and, at the same time, feeding out the regenerated medium from said first liquid tank.

5. An apparatus according to claim 1 wherein there is further provided an incinerator for burning up the slurry containing insoluble fine particles which was separated from supernatant having the sticking matter dissolved therein.

6. An apparatus according to claim 5 wherein the incinerator using a two-fluid spray burner of the outside-mixing type is employed.

7. An apparatus according to claim 1 wherein there is further provided a line for supplying to the free board of the fluidized-bed furnace the slurry containing insoluble fine particles which was separated from a supernatant having the sticking matter dissolved therein.

* * * * *